US011710305B2

(12) United States Patent
Anderson et al.

(10) Patent No.: US 11,710,305 B2
(45) Date of Patent: *Jul. 25, 2023

(54) TRACKED ENTITY DETECTION VALIDATION AND TRACK GENERATION WITH GEO-RECTIFICATION

(71) Applicant: Palantir Technologies Inc., Denver, CO (US)

(72) Inventors: Leah Anderson, Richmond, CA (US); Mark Montoya, Arlington, VA (US); Andrew Elder, New York, NY (US); Alisa Le, Brooklyn, NY (US); Ezra Zigmond, Palo Alto, CA (US); Jocelyn Rivero, Los Angeles, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,470

(22) Filed: Nov. 9, 2021

(65) Prior Publication Data

US 2022/0067448 A1    Mar. 3, 2022

Related U.S. Application Data

(63) Continuation of application No. 16/679,092, filed on Nov. 8, 2019, now Pat. No. 11,170,268.

(60) Provisional application No. 62/909,127, filed on Oct. 1, 2019.

(51) Int. Cl.
*G06K 9/62* (2022.01)
*G06K 9/00* (2022.01)
(Continued)

(52) U.S. Cl.
CPC .......... *G06V 10/945* (2022.01); *G06F 18/213* (2023.01); *G06F 18/2148* (2023.01); *G06F 18/2178* (2023.01); *G06V 10/774* (2022.01); *G06V 20/53* (2022.01)

(58) Field of Classification Search
CPC ............ G06K 9/6263; G06K 9/00778; G06K 9/6232; G06K 9/6257
See application file for complete search history.

(56) References Cited

U.S. PATENT DOCUMENTS

| 11,170,268 B2* | 11/2021 | Anderson ............ G06K 9/6232 |
| 2014/0365506 A1* | 12/2014 | Gong ...................... G06F 16/24 |
| | | 707/748 |

OTHER PUBLICATIONS

Extended European Search Report for EP Application No. 20198511.6 dated Feb. 25, 2021, 7 pages.

(Continued)

*Primary Examiner* — David F Dunphy
(74) *Attorney, Agent, or Firm* — Sheppard Mullin Richter & Hampton LLP

(57) ABSTRACT

Described herein are systems, methods, and non-transitory computer readable media for validating or rejecting automated detections of an entity being tracked within an environment in order to generate a track representative of a travel path of the entity within the environment. The automated detections of the entity may be generated by an artificial intelligence (AI) algorithm. The track may represent a travel path of the tracked entity across a set of image frames. The track may contain one or more tracklets, where each tracklet includes a set of validated detections of the entity across a subset of the set of image frames and excludes any rejected detections of the entity. Each tracklet may also contain one or more user-provided detections in scenarios in which the tracked entity is observed or otherwise known to be present in an image frame but automated detection of the entity did not occur.

20 Claims, 10 Drawing Sheets

(51) Int. Cl.
  *G06V 10/94* (2022.01)
  *G06V 20/52* (2022.01)
  *G06F 18/21* (2023.01)
  *G06F 18/213* (2023.01)
  *G06F 18/214* (2023.01)
  *G06V 10/774* (2022.01)

(56) References Cited

OTHER PUBLICATIONS

Wang, et al., "A Semi-Automatic Video Labeling Tool for Autonomous Driving Based on Multi-Object Detector and Tracker", 2018 Sixth International Symposium on Computing and Networking (CANDAR), IEEE, Nov. 23, 2018, pp. 201-206.
Examination Report dated Mar. 23, 2023, issued in related European Patent Application No. 20198511.6 (5 pages).
Robert Kaucic et al., "A Unified Framework for Tracking Through Occlusions and Across Sensor Gaps", Proceedings/2005 IEEE Computer Society Conference on Computer Vision and Pattern Recognition, CVPR 2005, vol. 1, Jun. 20, 2005, pp. 990-997.
Thomas Zhang, "Long-Term Multi-Object Tracking in Indoor Environments Using Network Flows", URL:https://dspace.mit.edu/bitstream/handle/1721.1/113461/1020286499-MIT.pdf?sequence=1&isAllowed=y [retrieved on Mar. 17, 2023], Jun. 1, 2017, pp. 1-48.
Weijiang Feng et al., "Online Multiple-Pedestrian Tracking With Detection-Pair-Based Graph Convolutional Networks", IEEE Internet of Things Journal, vol. 9, No. 24, Dec. 15, 2022, pp. 25086-25099.

\* cited by examiner

TRACKED ENTITY DETECTION VALIDATION AND TRACK GENERATION WITH GEO-RECTIFICATION

CROSS REFERENCE TO RELATED APPLICATIONS

This application in a continuation of U.S. application Ser. No. 16/679,092, filed Nov. 8, 2019, which claims the benefit under 35 U.S.C. § 119(e) of U.S. Provisional Application No. 62/909,127, filed Oct. 1, 2019, the content of each of which is incorporated by reference in its entirety into the present disclosure.

FIELD OF THE INVENTION

The present invention relates generally to monitoring of a physical environment, and more specifically, to approaches for validating artificial intelligence (AI)-based detections of an entity within an environment in order to construct an accurate representation of a path traversed by the entity through the environment.

BACKGROUND

Various surveillance systems exist for monitoring activity within an environment. Such systems may capture image/video data of an environment, which may then be analyzed to assess the types of entities and activity occurring in the environment. In some cases, artificial intelligence (AI)-based techniques may be employed to automate the detection of entities in an environment. However, as an entity traverses an environment, AI-based automated entity detection may fail for a variety of reasons such as the entity being obstructed from view, another entity inadvertently being detected as the entity, or the like.

SUMMARY

Described herein are systems, methods, and non-transitory computer readable media for validating or rejecting automated detections of an entity being tracked within an environment to generate a track representative of an actual travel path of the entity within the environment. The automated detections of the entity may be generated by an artificial intelligence (AI) algorithm. The track may represent a travel path of the tracked entity across a set of image frames. The track may contain one or more tracklets, where each tracklet includes a set of validated detections of the entity across a subset of the set of image frames. Each tracklet may also contain one or more user-provided detections in scenarios in which the tracked entity is observed or otherwise known to be present in an image frame but automated detection of the entity did not occur. Tracklets that are determined to correspond to the same tracked entity traversing portions of a same travel path in geometric space over a period of time may be appended together to form the track.

In an example embodiment, a method includes presenting, via a first user interface, indicia representative of multiple detections of an entity within an environment across a set of image frames. The method further includes receiving, via the first user interface, a selection of a particular detection of the entity for a particular image frame and presenting a second user interface for viewing a set of detections of the entity across a subset of the set of image frames. In an example embodiment, the subset of image frames includes the particular image frame. The method additionally includes receiving, via the second user interface, input validating or rejecting each detection in the set of detections of the entity and constructing a tracklet representing at least a portion of a travel path of the entity, where the tracklet includes each validated detection and excludes each rejected detection.

In an example embodiment, receiving the input validating or rejecting each detection in the set of detections includes determining, for each detection in the set of detections, that a first user interface control element corresponding to validation of the detection has been selected or a second user interface control element corresponding to rejection of the detection has been selected.

In an example embodiment, the method further includes receiving, via the second user interface, input corresponding to a user-provided detection of the entity and adding the user-provided detection to a corresponding image frame in the subset of image frames. In an example embodiment, the tracklet includes the user-provided detection of the entity.

In an example embodiment, the multiple detections of the entity are automated detections identified by an artificial intelligence algorithm, the entity is at least partially obstructed in the corresponding image frame, and an automated detection of the entity is not associated with the corresponding image frame based at least in part on the partial obstruction of the entity.

In an example embodiment, a second tracklet is appended to the first tracklet to form at least a portion of a track representing the travel path of the entity.

In an example embodiment, the subset of the set of image frames is a first subset of image frames, the first tracklet includes a first set of validated detections of the entity across the first subset of image frames, the second tracklet includes a second set of validated detections of the entity across a second subset of the set of image frames, and one or more image frames that do not include any detection of the entity occur between the first subset of image frames and the second subset of image frames.

In an example embodiment, the method further includes performing a geo-rectification of the track to adjust the track to conform to underlying static map data. In an example embodiment, performing the geo-rectification includes receiving input corresponding to user manipulations of the track in relation to the static map data and generating a geo-rectified track by adjusting the track based at least in part on the input corresponding to the user manipulations.

In an example embodiment, the multiple detections of the entity are automated detections identified by an artificial intelligence algorithm, and the method further includes providing an indication of the tracklet as training feedback to the artificial intelligence algorithm.

In example embodiments, systems are provided that are configured to implement the above-described methods according to any of the example embodiments. The systems include at least one processor and at least one memory storing computer-executable instructions. The at least one processor is configured to access the at least one memory and execute the computer-executable instructions to perform any of the above-described methods. In addition, in example embodiments, computer program products are provided. The computer program products include non-transitory computer readable media readable by a processing circuit and storing instructions executable by the processing circuit to cause any of the above-described methods to be performed.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
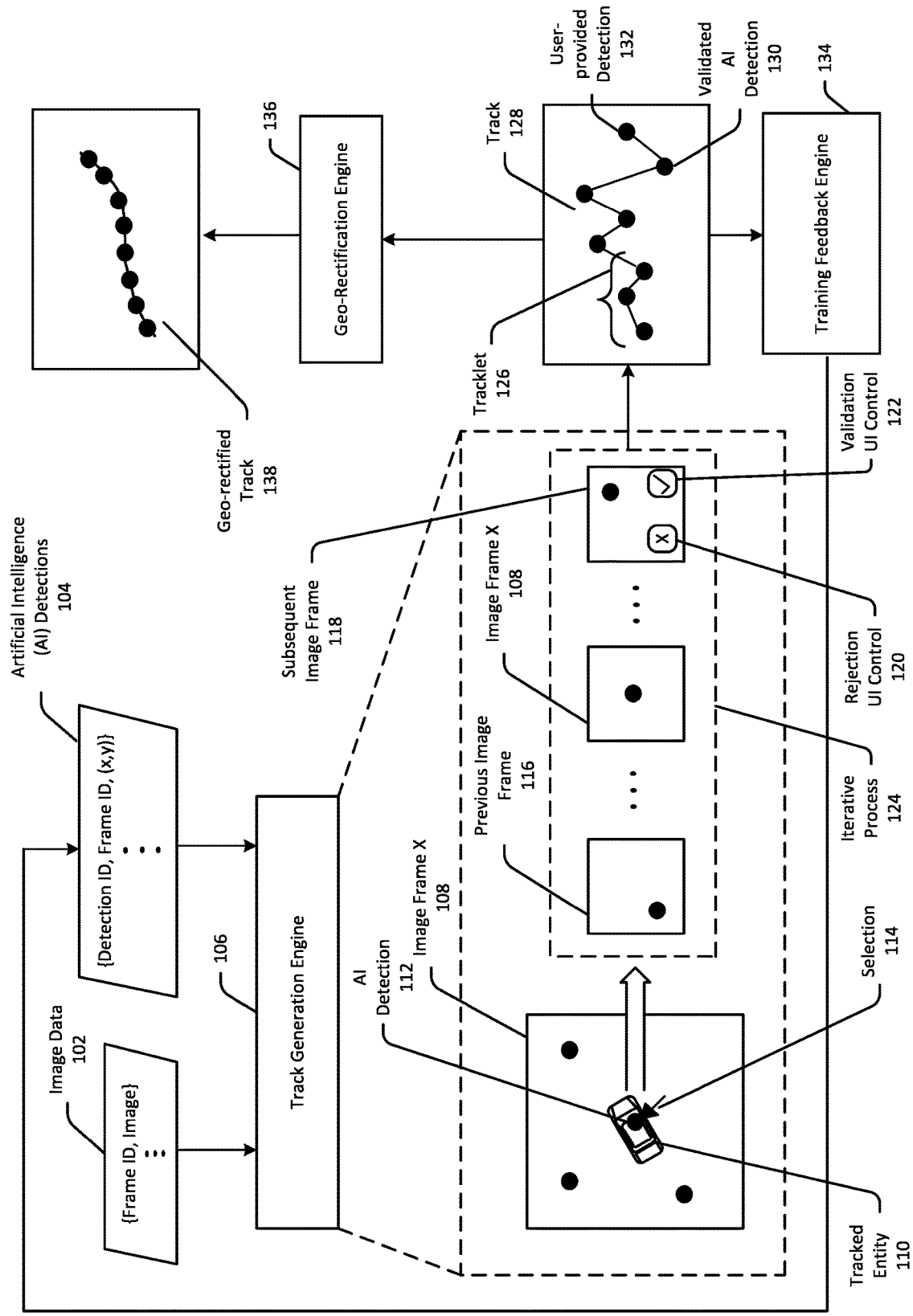
FIG. 1 illustrates generation of a track containing validated detections of a tracked entity and geo-rectification of the track in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Example embodiments of the invention provide technical solutions to various technical problems associated with existing automated entity detection techniques. These technical solutions are rooted in computer technology and overcome problems specifically arising in the realm of computer technology. More specifically, example embodiments of the invention relate to, among other things, systems, methods, and non-transitory computer readable media for validating or rejecting automated detections of an entity being tracked within an environment in order to generate a track representative of an actual travel path of the entity within the environment. The automated detections of the entity may be generated by an AI-based algorithm. The track may represent a travel path of the tracked entity across a set of image frames. The track may contain one or more tracklets, where each tracklet includes a set of validated detections of the entity across a subset of the set of image frames. Each tracklet may also contain one or more user-provided detections in scenarios in which the tracked entity is observed or otherwise known to be present in an image frame but automated detection of the entity did not occur.

In example embodiments, raw video data of a physical environment may be captured. In an example embodiment, the raw video data may be a series of images captured by various sources, e.g., weather balloons, helicopters, planes, or satellites, which are then "stitched" together to generate the video imagery. For instance, a satellite may capture images of a portion of a physical environment at a corresponding frame rate. The image frames captured by one or more satellites may then be ordered based on timestamps associated with the captured images to generate a video animation of activity within the physical environment.

In example embodiments, an algorithm may be executed on the image data to perform automated detection of entities that are being tracked within an environment. In certain example embodiments, the algorithm for performing automated detection of entities within an environment may be an AI-based machine learning algorithm. It should be appreciated that any suitable AI construct/model may be employed. More generally, the AI-based algorithm may be any trained classifier for detecting different types of entities within a tracked environment.

Some automated entity detection algorithms such as some AI-based entity detection algorithms may have difficulty detecting an entity beyond a certain number of image frames for various reasons. For instance, a tracked entity such as a vehicle may be detected for a certain number of image frames, but another passing vehicle or the like may cause the AI detection algorithm to incorrectly interpret the passing vehicle as the tracked entity such that the algorithm generates a false positive outcome. In particular, in such an example scenario, the AI detection algorithm may detect the passing vehicle as the tracked entity, and thus, detect the presence of the tracked entity at a particular location and point in time during which the tracked entity is not in fact at that particular location.

Another non-limiting example of a scenario in which an AI detection algorithm may fail is when a tracked entity becomes obstructed from view. For instance, within an image frame, a tracked entity may become obstructed from view by a tree, a cloud, another entity, or the like, in which case, the AI detection algorithm may fail to detect the entity. This is a false negative result because the entity is not detected even though it is present within the image frame. While the AI detection algorithm may detect the tracked entity again at some later point in time when the entity is no longer obscured, it is incapable of associating the detections prior to the entity becoming obscured with the later detections after the entity is no longer obscured. Instead, the AI detection algorithm would likely interpret the two sets of detections (pre and post obscurement) as corresponding to different entities.

In still other example scenarios, an AI detection algorithm may fail due to discontinuities that may exist across stitched image frame boundaries. As previously noted, raw video data of a physical environment may include a series of images captured by various sources that are "stitched" together to generate video imagery of the environment. "Stitching" may refer to any process for appending the image frames together to generate the video imagery. In example scenarios, such a process may introduce discontinuities along the boundary of two image frames that have been stitched together. These discontinuities may cause an AI detection algorithm to fail when, for example, a tracked entity traverses a location in the physical environment that corresponds to a boundary between stitched image frames.

Yet another non-limiting example scenario in which an AI detection algorithm may fail is when a non-environmental visual change that is inherent to a tracked entity occurs. For example, an AI detection algorithm may fail to determine that a loaded truck and an empty truck (with the contents unloaded) correspond to the same tracked entity. Thus, changes that are inherent to a tracked entity and unrelated to the environment in which the tracked entity is moving may also result in an AI detection failure mode.

Example embodiments of the invention provide technical solutions that address at least the aforementioned technical drawbacks associated with some automated entity detection algorithms. In example embodiments, image data contains a series of image frames captured by one or more image capturing devices. Each image capturing device may capture images of a portion of a physical environment at a corresponding frame rate, and the images captured by multiple image capture devices may be aggregated together to form a series of image frames that can be presented in succession to produce video imagery of the surveilled environment. In addition to the image data, a set of AI detections may be received. The set of AI detections may include each entity that was detected by an AI detection algorithm within each image frame.

In example embodiments, the video imagery may be presented via a graphical display with indicia of the AI detections overlayed on the video imagery. An AI detection may be indicated using a graphical symbol, a textual symbol, or the like. In certain example embodiments, the type of symbol chosen may reflect the type of entity detected. In example embodiments, a user may be provided with the capability to pause the video imagery on a given image frame and select any AI detection within the paused video frame. Once a particular AI detection corresponding to a particular tracked entity is selected, a user interface (UI) may be presented for previewing a subset of image frames containing AI detections of the tracked entity.

In example embodiments, the preview UI may include UI controls for advancing backward to image frames prior to the paused image frame in which the AI detection was selected and for advancing forward to subsequent image frames that occur after the paused image frame in the video imagery. The preview UI may further include UI controls for validating or rejecting an AI detection within a given image frame. In example embodiments, an AI detection may be validated for a given image frame if, based on visual inspection for example, it is determined that an (x,y) coordinate of the AI detection accurately corresponds to the location of the tracked entity within the image frame at a time corresponding to the timestamp of the AI detection. In contrast, in example embodiments, an AI detection may be rejected for a given image frame if it is determined that an (x,y) coordinate of the AI detection does not correspond to the location of the tracked entity within the image frame at a time corresponding to the timestamp of the AI detection. This may occur, for example, if the AI detection algorithm mistakes another entity for the entity being tracked (e.g., a passing vehicle).

A tracklet may then be generated for the previewed subset of image frames. The tracklet may contain each validated AI detection within the subset of image frames and may exclude each rejected AI detection within the subset of image frames. In certain example embodiments, a user may add a detection to an image frame even if no AI detection is present in the image frame. For instance, if a tracked entity becomes obscured by an object in the environment (e.g., a cloud, a tree, a building, another entity, etc.), the AI detection algorithm may fail to detect the entity due to the entity not being visible or being only partially visible within the image frame. A user reviewing the video imagery, however, may understand that the tracked entity is still present in the environment, but simply obscured in the image frame. Accordingly, in example embodiments, the preview UI may include a UI control that enables a user to add a detection to the image frame despite the absence of an AI detection. Each such user-provided detection across the previewed subset of image frames may be incorporated into the tracklet that is generated for that subset of image frames. As such, in example embodiments, a tracklet may include both validated AI detections as well as user-provided detections.

In example embodiments, once a tracklet is generated for a tracked entity with respect to a given subset of image frames, the video imagery can be advanced to an image frame subsequent to the subset of image frames, another AI detection may be selected, the preview UI may again be presented, and the above-described process may proceed iteratively for a next subset of image frames. In this manner, multiple tracklets may be generated for a given tracked entity, where each tracklet includes validated AI detections, and optionally, one or more user-provided detections of the tracked entity for a corresponding subset of image frames. In example embodiments, multiple tracklets may be appended together to form a track for a given tracked entity. The track may include a set of validated AI detections, and optionally, one or more user-provided detections of a tracked entity that correspond to a tracked entity's path of travel over the set of image frames in which the tracked entity is present in the video imagery.

Example embodiments of the invention provide a technical solution to the technical problems of false negative and false positive detections that occur with some AI entity detection algorithms. In particular, as previously noted, some AI detection algorithms can generate a false positive AI detection when the algorithm detects a tracked entity at a particular location and point in time even though the entity is not in fact present at that location at that point in time. This can occur for a variety of reasons. For example, the AI detection algorithm may mistakenly interpret another entity in an image frame (e.g., another entity passing in proximity to the tracked entity) as being the tracked entity. In addition, some AI detection algorithms may generate a false negative AI detection (i.e., failing to detect the actual presence of a tracked entity) when, for example, the tracked entity becomes obscured by a geographic feature (natural or man-made), another entity, and so forth.

Example embodiments of the invention provide a technical solution to the aforementioned technical problems of false negative and false positive detections that occur with some AI entity detection algorithms by providing a capability to a user to validate or reject AI detections for a tracked entity for a subset of image frames and the capability to manually add detections in cases where the AI detection algorithm failed to detect the actual presence of a tracked entity. In this manner, a tracklet can be constructed for each subset of image frames, where the tracklet includes only validated AI detections of a tracked entity, and optionally, user-provided detections, but excludes any rejected AI detections.

Thus, the tracklet more accurately reflects the actual path traversal of the tracked entity for the corresponding subset of image frames than does the original set of AI detections for the subset of image frames. In particular, because the tracklet contains only validated AI detections, and optionally, user-provided detections that are confirmed by the video imagery, the tracklet does not include any false positive or false negative AI detections, and thus, more accurately reflects the actual path traversed by the tracked entity for the given subset of frames. Thus, the capability to generate such accurate tracklets constitutes a technical solution to the technical problem of false positive or false negative AI detections, and thus, constitutes an improvement to computer technology.

Moreover, in example embodiments, a user may determine, based on visual inspection of the video imagery for example, that multiple tracklets correspond to a same tracked entity at different points in time in a path traversed by the entity. In such example embodiments, the tracklets may be appended together to form a track that is representative of a path traversed by the tracked entity across all image frames in which the entity is present. Some AI detection algorithms may fail to detect a tracked entity while it is obscured. These algorithms may be able to detect the entity again beginning with some subsequent image frame in which the entity is no longer obscured, but are incapable of understanding that the set of detections that occurred prior to the entity becoming obscured and the set of detections after the entity is no longer obscured correspond to the same travel path for the tracked entity. Thus, this capability to string together tracklets to form a track that accurately detects an entire travel path of a tracked entity within the video imagery constitutes an additional technical solution to the technical problem that some AI detection algorithms face when tracking an entity that may become at least partially obscured across one or more image frames in the video imagery. Further, in some example scenarios, an AI detection algorithm may fail to continue to detect a tracked entity if the entity crosses a physical location corresponding to a boundary between stitched image frames and/or if visual changes occur to the tracked entity that are not caused by its environment (e.g., the appearance of the tracked entity changes). The capability to string together tracklets to form a track representative of the entire travel path of a tracked entity constitutes a technical solution to the technical problem of failed AI detection encountered by some AI detection algorithms in such additional example scenarios as well. Thus, the capability to append tracklets together constitutes an additional improvement to computer technology.

In example embodiments, a track is generated in the pixel space of the image data, and thus, may not align with corresponding static map data. More specifically, a track may deviate from the actual travel path of a tracked entity in geometric space due to spatial and temporal limitations associated with the process for generating the video imagery that may include stitching together multiple image frames that are captured from different viewpoints and that cover different portions of a physical environment. In such example embodiments, a geo-rectification of the track can be performed. As part of the geo-rectification process, the track may be presented as an overlay on the underlying static map data, and a user may be provided with UI controls to manually adjust the track to conform to the actual path traveled by the tracked entity on the map. The geo-rectified track may then be stored as an object that can be exported and accessed later. The geo-rectified track represents a path traveled by a tracked entity over a period of time, and thus, constitutes a technical solution and a technological improvement over some entity tracking techniques that fail to associate time with a tracked entity path.

In addition, in example embodiments, a track generated for a given tracked entity and/or the corresponding geo-rectified track may be provided as training feedback to an AI detection algorithm that generated the AI detections. In this manner, the AI detection algorithm can be further trained to improve its detection accuracy based on information regarding which AI detections were validated, which were rejected, and which were missed (as indicated by any user-provided detections). This constitutes a further improvement to computer technology provided by example embodiments of the invention.

Figure 4:
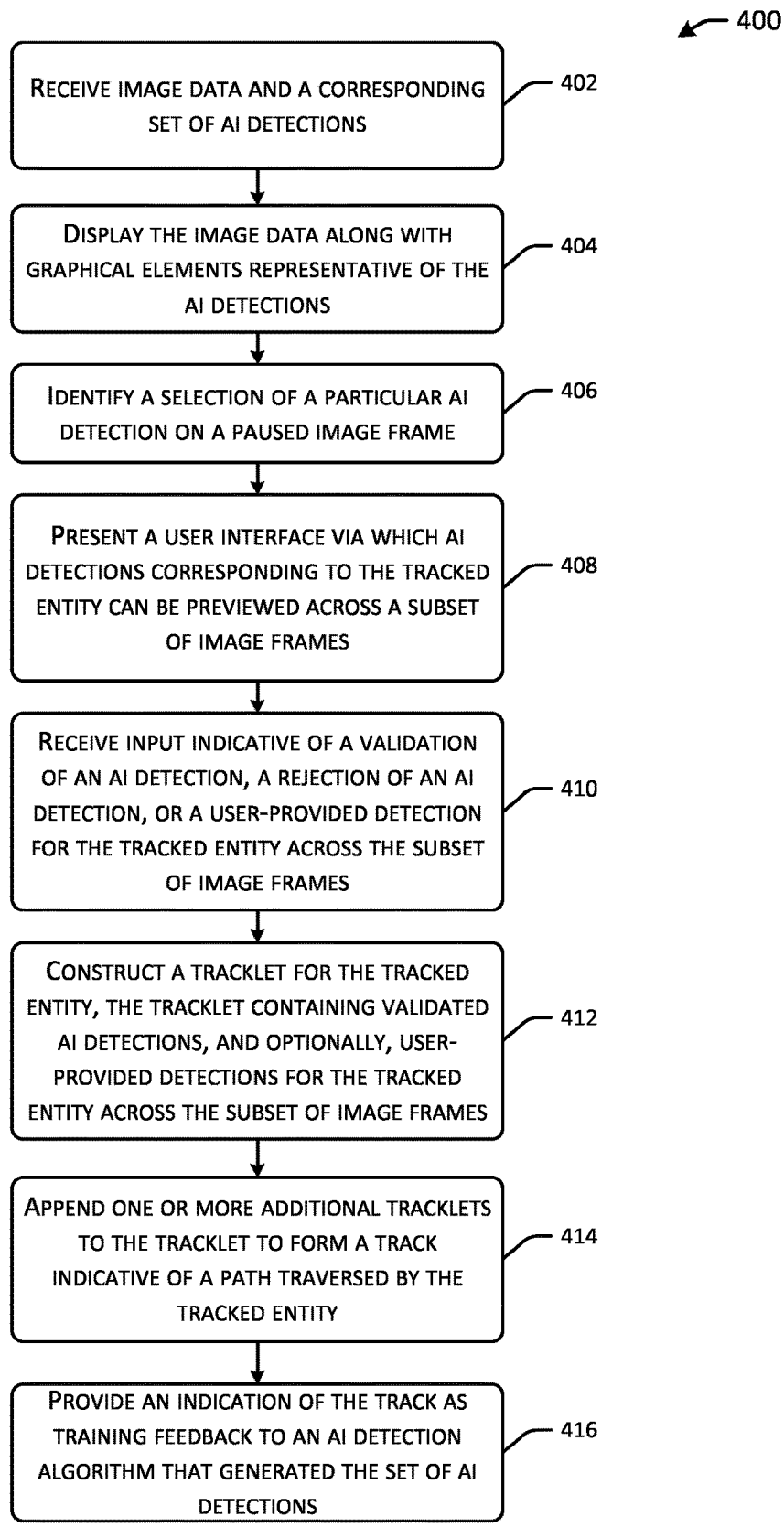
FIG. 4 is a process flow diagram of an illustrative method for generating a track containing validated detections of a tracked entity in accordance with an example embodiment of the invention.
Figure 5:
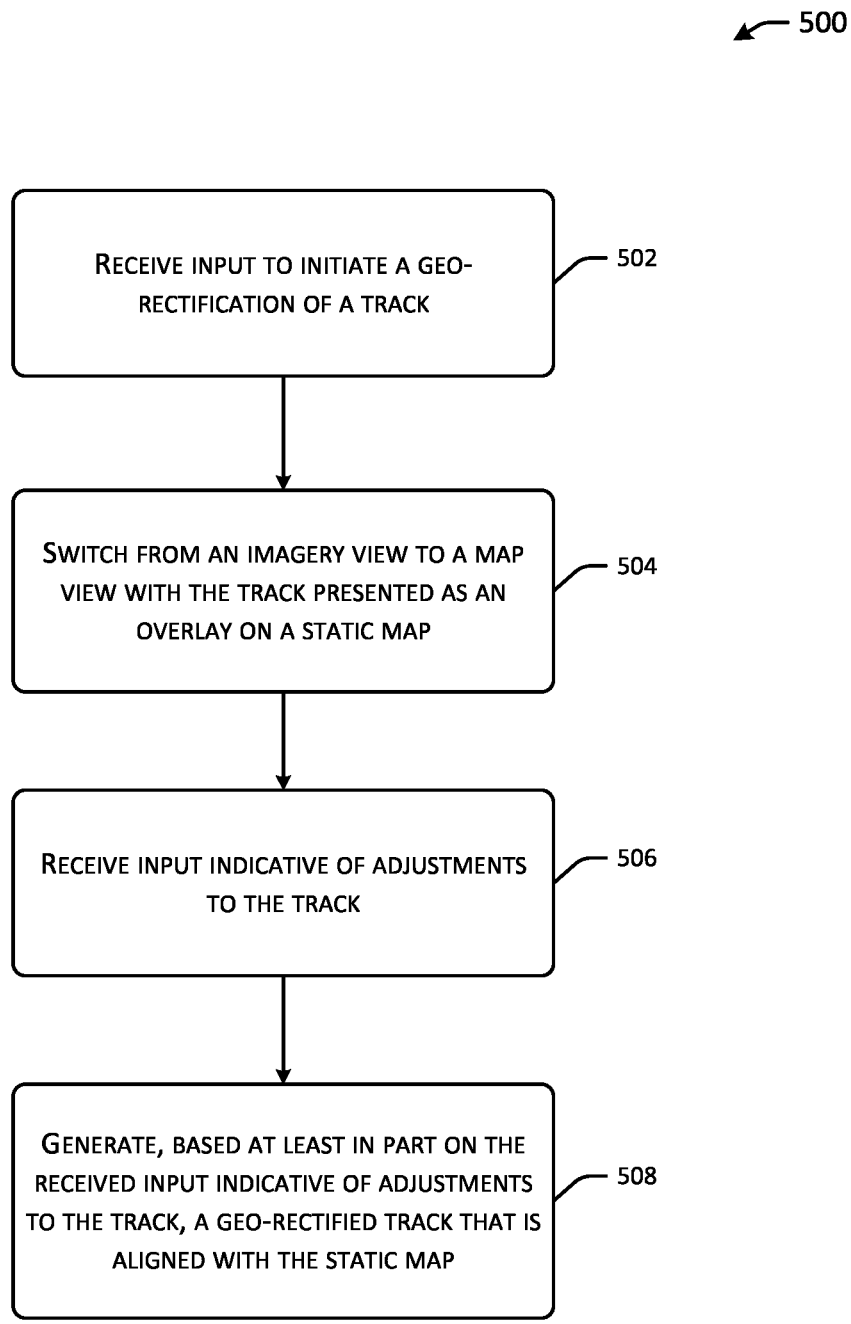
FIG. 5 is a process flow diagram of an illustrative method for geo-rectifying a track in accordance with an example embodiment of the invention.

FIG. 1 illustrates generation of a track containing validated detections of a tracked entity and geo-rectification of the track in accordance with an example embodiment of the invention. FIG. 4 is a process flow diagram of an illustrative method 400 for generating a track containing validated detections of a tracked entity in accordance with an example embodiment of the invention. FIG. 5 is a process flow diagram of an illustrative method 500 for geo-rectifying a track in accordance with an example embodiment of the invention. FIG. 4 will first be described in conjunction with FIG. 1 hereinafter. FIG. 5 will be described in conjunction with FIG. 3 later in this disclosure.

Each operation of the method 400 and/or the method 500 can be performed by one or more of the engines depicted in FIGS. 1 and 6, for example, whose operation will be described in more detail hereinafter. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In other example embodiments, these engines may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 4 in conjunction with FIG. 1, a track generation engine 106 may receive image data 102 and a corresponding set of AI detections 104 at block 402 of the method 400. In example embodiments, the image data 102 may be received as sets of image frame identifiers and corresponding image frames. In example embodiments, the image frames of the image data 102 may be "stitched" together or otherwise combined or linked to produce a sequence of image frames that can be played in succession to produce video imagery of a physical environment collectively captured by the image frames. For instance, in example embodiments, multiple satellites—each having a different viewpoint of a physical environment—may capture respective image frames at a corresponding frame rate. The image frames collectively captured by multiple satellites may be stitched together based on the spatial relationship between the portions of the physical environment captured by each satellite as well as timestamps indicating when the image frames were captured to produce the video imagery of the physical environment.

In example embodiments, the AI detections 104 may have been generated by an AI entity detection algorithm. Each AI detection may be represented as an n-tuple. For instance, each AI detection may be represented as a detection identifier, an image frame identifier, and an (x, y) coordinate (or a collection of (x, y) coordinates) corresponding to a location of the AI detection within the image frame identified by the image frame identifier. In some example embodiments, the detection identifier may be indicative of a particular AI detection at a particular timestamps. In some example embodiments, an AI detection (and the resulting time/position output) may not be a single (x, y) coordinate, but could potentially be a polygon or some other shape represented by a set of pixel or geographic coordinates. For example, an AI detection corresponding to a tracked entity whose shape changes over time (e.g., a forest fire) may be represented by a collection of coordinates indicative of a detected shape of the tracked entity.

In some example embodiments, the detection identifier may correspond to a particular tracked entity. Thus, if an entity is tracked across multiple image frames, as will often be the case, multiple AI detections may correspond to the tracked entity, with each detection having the same detection identifier but different image frame identifiers and likely different pixel space coordinates. If an AI detection algorithm fails to detect a tracked entity that has become obscured but later begins detecting the entity again, the renewed detections of the entity may be associated with a different detection identifier than the detections prior to obscurement. This may be the case because the AI detection algorithm may not recognize that the different sets of detections correspond to the same tracked entity.

In example embodiments, at block 404 of the method 400, the track generation engine 106 may present a first UI in which the image data 102 is displayed along with graphical elements representative of the AI detections 104. It should be appreciated that any suitable graphical or textual symbol can be used to represent an AI detection. In some example embodiments, the type of symbol used (e.g., circle vs. triangle) may indicate the type of entity represented by the detection. In example embodiments, the first UI may include UI playback controls for playback of the image frames of the image data 102 in succession to form video imagery of a physical environment.

At block 406 of the method 400, the track generation engine 106 may identify a selection 114 of a particular AI detection 112 within a paused image frame 108. For instance, in example embodiments, a user may pause the video imagery at a particular image frame 108 (depicted as Image Frame X in FIG. 1). The user may then make a selection 114 of an AI detection 112 within the paused image frame 108 that corresponds to a particular tracked entity 110. The tracked entity 110 may be any entity that traverses a physical environment and that a user may wish to surveil including, without limitation, a person, a vehicle, a geographic event (e.g., a forest fire), or the like.

At block 408 of the method 400, the track generation engine 106 may present a second UI via which AI detections corresponding to the tracked entity 110 can be previewed across a subset of image frames. For example, responsive to the selection 114 of the AI detection 112 in the paused image frame 108, the second UI may be presented as an overlay over the first UI and may contain UI controls for advancing from the current paused image frame 108 to a subsequent image frame 118 or advancing backward to a previous image frame 116, such that AI detections corresponding to the tracked entity 110 can be previewed across a subset of image frames that encompasses the paused image frame 108. Each such image frame in the subset of image frames is presented in the second UI in a manner that focuses on the AI detection in that image frame that corresponds to the tracked entity 110.

At block 410 of the method 400, the track generation engine 106 may receive input indicative of a validation of an AI detection, a rejection of an AI detection, or a user-provided detection for the tracked entity 110 across the subset of previewed image frames. For instance, the second UI may include a validation UI control 122 selectable by a user to indicate that an AI detection present in a given image frame is valid and correct. In example embodiments, a user may validate an AI detection based on a comparison of the (x, y) coordinate location of the AI detection in the image frame (or set of (x, y) coordinates) and the location of the tracked entity 110 in the image frame. In example embodiments, the second UI may also include a rejection UI control 120 selectable by a user to indicate that an AI detection does not accurately correspond to the tracked entity 110, and thus, should be rejected.

At block 412 of the method 400, the track generation engine 106 may generate a tracklet 126 for the tracked entity 110 with respect to the subset of image frames. The tracklet 126 may contain each AI detection 130 in the subset of image frames that was validated and may exclude each AI detection in the subset of image frames that was rejected. In addition, the tracklet 126 may optionally include one or more user-provided detections 132 corresponding to one or more image frames in which no AI detection was present but the tracked entity 110 was nonetheless determined to be present in the one or more image frames based on visual inspection.

In example embodiments, the tracklet generation process may be an iterative process 124 that can be repeated for subsequent subsets of image frames. For instance, after tracklet 126 is generated, a user may exit from the second UI, advance forward in the video imagery via the first UI, and select another AI detection on a paused image frame that occurs subsequent to the subset of image frames for which the tracklet 126 was generated. The iterative process 124 may be repeated with respect to this subsequent subset of image frames and another tracklet may be generated for the tracked entity 110 (or another entity entirely) with respect to this subsequent subset of image frames. The iterative process 124 may continue for any number of subsets of image frames.

At block 414 of the method 400, the track generation engine 106 may append one or more additional tracklets to the tracklet 126 to form a track 128. The track 128 may contain a series of validated AI detections of the tracked entity 110, and optionally, one or more user-provided detections that reflect a path traversed by the tracked entity 110 across a set of image frames in which the tracked entity 110 appears. For instance, if the tracked entity 110 becomes obscured by another object (e.g., a cloud, a rock formation, another tracked entity, etc.), the tracked entity 110 traverses a physical location corresponding to a boundary between stitched image frames, or a visual change inherent to the tracked entity 110 occurs, AI detection of the tracked entity 110 may cease after the AI detections forming the tracklet 126. An AI detection algorithm may then begin to detect the tracked entity 110 again after it is no longer obscured (or whatever other circumstance that caused the failed AI detection to occur is no longer present), but these subsequent AI detections may be interpreted by the AI detection algorithm as corresponding to a different entity than the tracked entity 110, and thus, may be associated with a different detection identifier. In such an example scenario, a user may perform the validation on the subsequent set of AI detections and a tracklet may be generated for the subsequent set of AI detections. A user may then instruct the track generation engine 106 to append this newly generated tracklet to the tracklet 126 to form at least a portion of the track 128 because the user knows, from visual inspection of the video imagery, that the two tracklets actually correspond to the same tracked entity 110 along different portions of the same travel path traversed by the tracked entity 110 over a period of time.

At block 416 of the method 400, a training feedback engine 134 may provide an indication of the track 128 (or of one or more tracklets forming the track) as training feedback to an AI detection algorithm that generated the set of AI detections 104. More specifically, the training feedback engine 134 may provide an indication of which AI detections were validated, and thus, form part of the track 128, which AI detections were rejected, and which image frames now include user-provided detections that were missed by the AI detection algorithm. Based on this feedback, the AI detection algorithm can be iteratively re-trained to improve its detection accuracy.

FIGS. 2A-2E illustrate a series of UIs and user selections of UI controls available through the UIs to validate or reject AI detections of a tracked entity and add user-provided detections such that a tracklet can be generated for the tracked entity with respect to a subset of image frames. As previously described, the tracklet includes only validated AI detections, and optionally, user-provided detection(s).

Figure 2A:
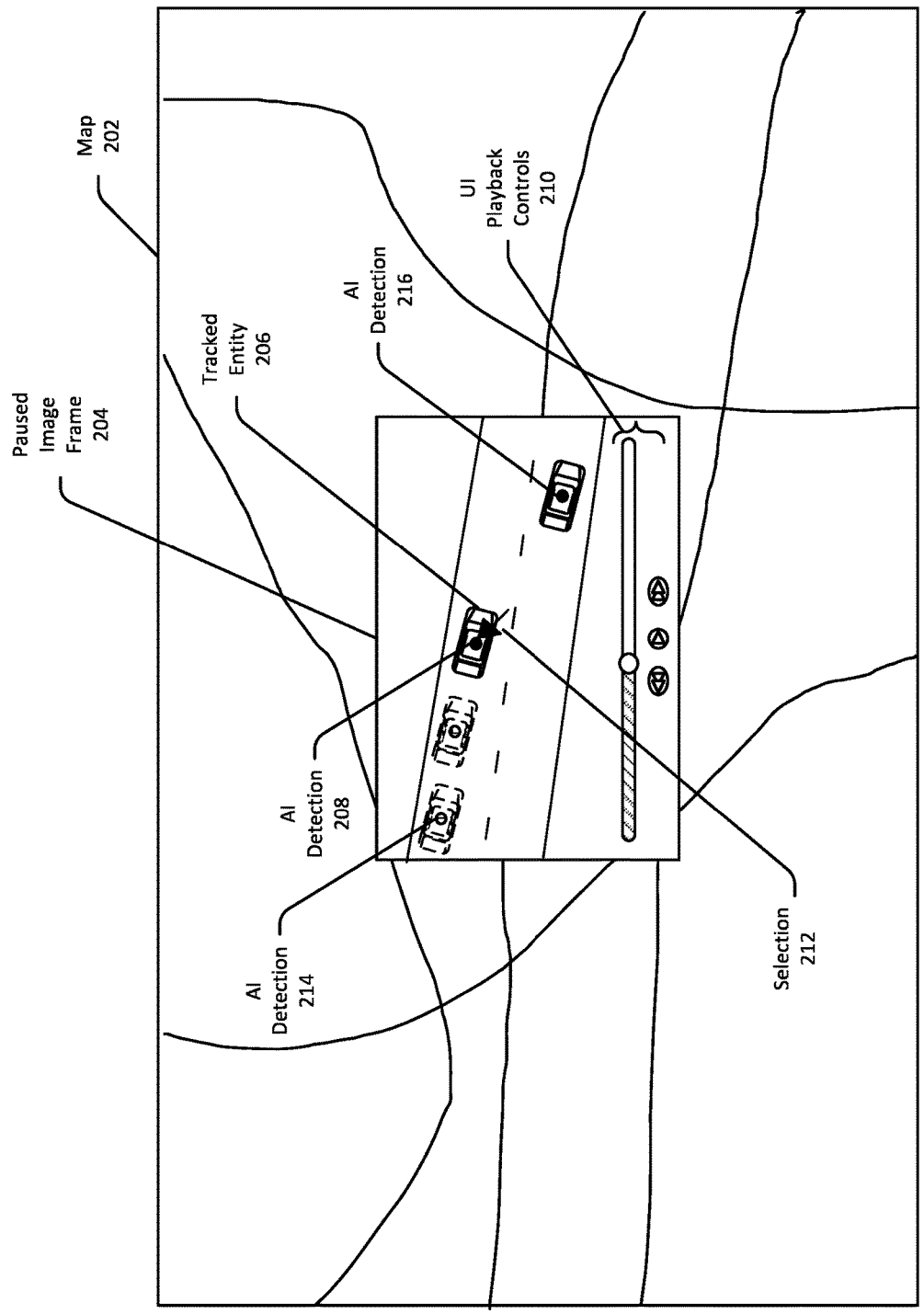
FIG. 2A illustrates a first user interface displaying a paused image frame along with corresponding AI detections of entities in accordance with an example embodiment of the invention.
Figure 2B:
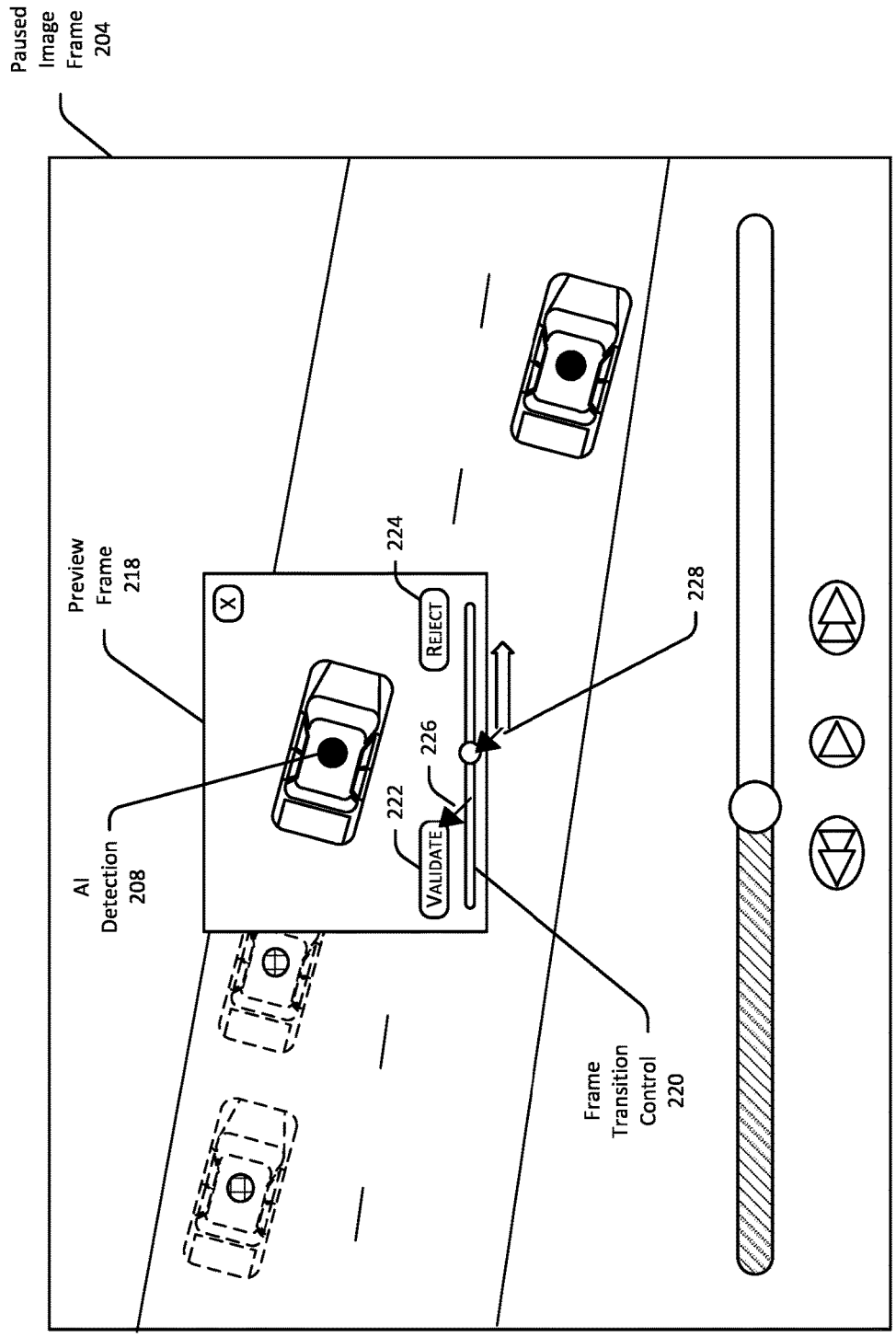
FIG. 2B illustrates a second user interface for previewing a subset of image frames that is displayed responsive to selection of a given AI detection in the first user interface in accordance with an example embodiment of the invention.

FIG. 2A illustrates a first UI displaying a paused image frame 204 along with indicia of AI detections 208, 216 corresponding to the paused image frame 204. In example embodiments, the first UI (shown in FIG. 2A as currently displaying the paused image frame 204) may be presented as an overlay over a corresponding portion of a static map 202. The paused image frame 204 may depict, for example, a portion of a roadway present in the map 202 along with images of entities present on that portion of the roadway at the point in time when the image frame 204 was captured as well as the AI detections 208, 216 generated with respect to the image frame 204. In example embodiments, the AI detection 208 may correspond to a tracked entity 206 within the image frame 204. The AI detection 216 may correspond to another entity detected within the image frame 204. For example, the AI detection 216 may corresponding to another vehicle traveling along the same road surface as the tracked entity 206 but in an opposing direction.

In example embodiments, the first UI may include UI playback controls 210 that allow a user to play the video imagery, pause at any given image frame, and advance forward or backward in the video imagery to other image frames. The AI detection 214 shown in dashed lines may be associated with an image frame prior to the paused image frame 204 and may correspond to a detected location of the tracked entity 206 within the prior image frame.

In example embodiments, the first UI may provide a capability for a user to select any AI detection within a paused image frame. For instance, a user could select the AI detection 208 corresponding to the tracked entity 206 or the AI detection 216 corresponding to another entity. Assuming that a user selects the AI detection 208, a second UI (also referred to herein as a preview UI) shown in FIG. 2B may be presented as an overlay over the first UI. In FIGS. 2A-2E, the map 202 is not depicted for the sake of simplicity; however, it should be appreciated that the first and second UIs may continue to be presented as overlays over the map 202.

The preview UI may initially display preview frame 218, which may be the paused image frame 204 that includes the AI detection 208 of the tracked entity 206. The preview UI may include a frame transition control 220 such as a scrolling bar or the like for advancing forward or backward from a current image frame being displayed to future image frames or prior image frames. A user may utilize the frame transition control 220 to transition through a subset of image frames that includes the paused image frame 204 (the preview frame 218).

The preview UI may include various UI controls for validating or rejecting a UI detection in an image frame. For instance, the preview UI may include a UI control 222 that a user may select to validate an AI detection within an image frame currently being displayed. In addition, the preview UI may include a UI control 224 that a user may select to reject an AI detection within an image frame currently being displayed. Further, the preview UI may include a UI control for inserting a user-provided detection in an image frame. This type of UI control will be depicted and described in reference to a later Figure.

In example embodiments, a user may select the UI control 222 to validate the AI detection 208 within the current preview image frame 218. The user may then select the frame transition control 222 to advance forward in the subset of image frames to a subsequent image frame 230 depicted in FIG. 2C. The preview image frame 230 now being displayed in the preview UI may be an immediately consecutive image frame to the preview image frame 218 or there may be one or more intervening image frames between the image frame 218 and the image frame 230.

Figure 2C:
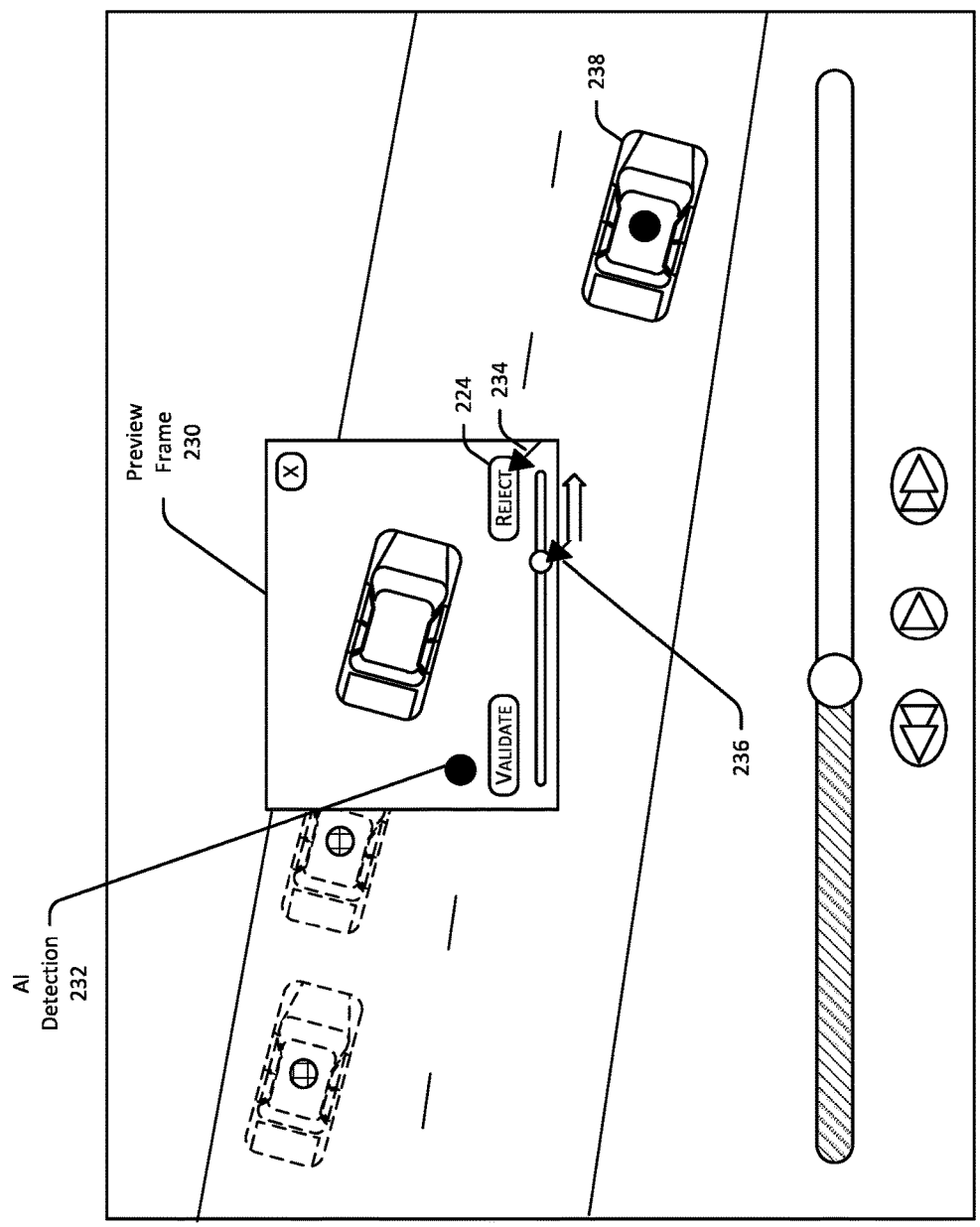
FIG. 2C illustrates a previewed image frame containing an AI detection that is rejected as invalid in accordance with an example embodiment of the invention.

As shown in FIG. 2C, the preview image frame 230 may include an AI detection 232. The AI detection 232, however, may be a false positive detection that actually corresponds to a different entity than the tracked entity 206. For instance, another vehicle 238 may be passing by the tracked vehicle 206 during the preview image frame 230. As such, an AI detection algorithm may misinterpret the passing vehicle 238 as the tracked vehicle 206 and generate the AI detection 232 having pixel coordinates that do not correspond to the location of the tracked entity 206 within the image frame 230. A user may determine that the AI detection 232 is a false positive based on a comparison of the pixel coordinates of the AI detection 232 in relation to the pixel coordinates of the tracked entity 206 within the image frame 230. Accordingly, a user may make a selection 234 of the UI control 224 to reject the AI detection 232. Having been rejected, the AI detection 232 will be excluded from a tracklet generated for the tracked entity 206 with respect to the current subset of image frames.

Figure 2D:
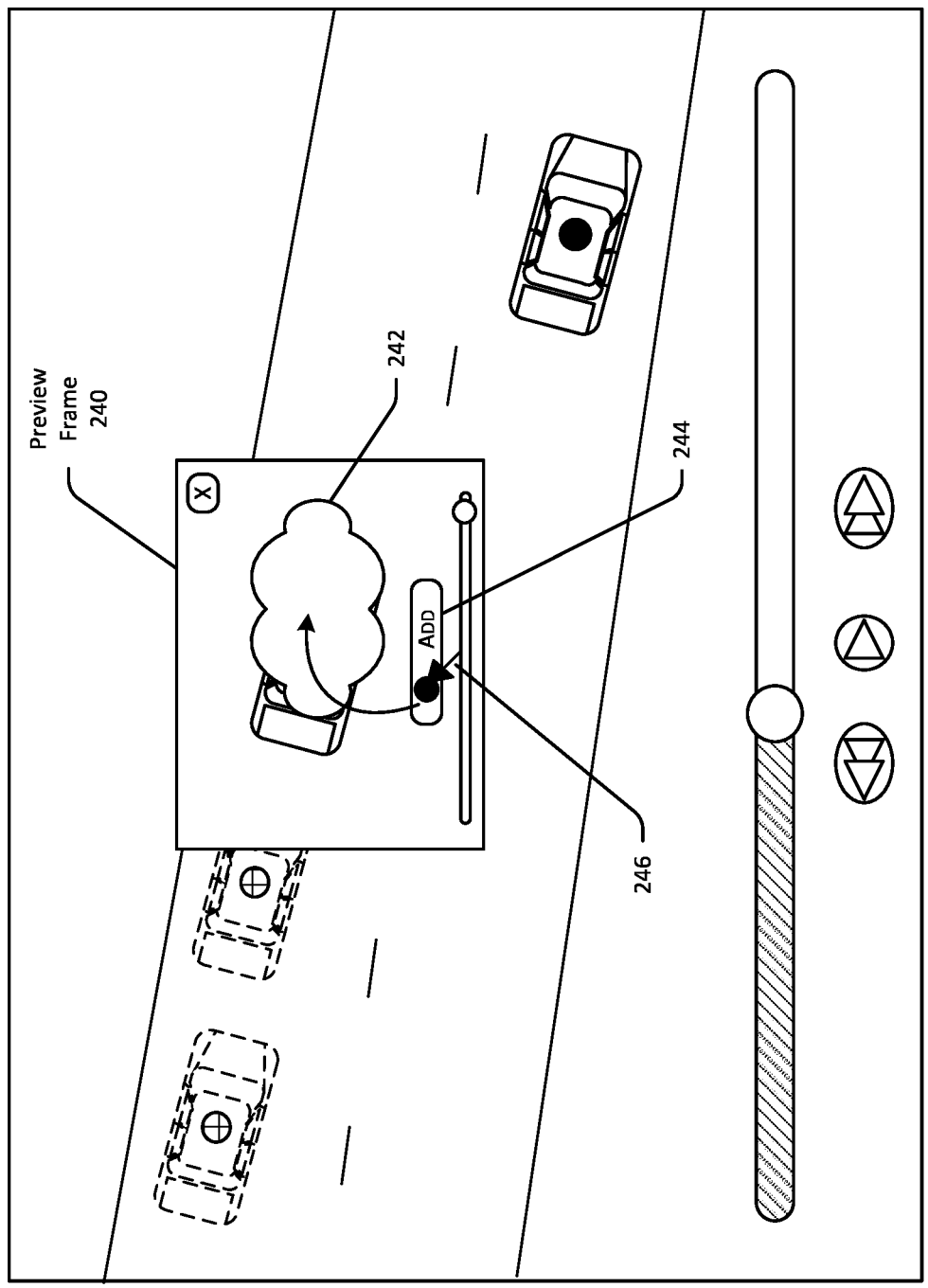
FIG. 2D illustrates the addition of a user-provided detection to a previewed image frame in accordance with an example embodiment of the invention.

In example embodiments, a user may then select 236 the frame transition control 220 to advance forward in the subset of image frames to a subsequent image frame 240 depicted in FIG. 2D. The image frame 240 may immediately follow the image frame 230 in the subset of image frames or there may be one or more intervening image frames between the image frame 230 and the image frame 240. In example embodiments, the image frame 240 may not include an AI detection. For instance, the tracked entity 206 may be obscured from view by an obstruction 242 such as a cloud or other natural geographic obstruction, a building, another entity, or the like. In other example embodiments, an AI detection may not be present in the image frame 240 due to stitched image frame boundary discontinuities and/or visual changes that occur to the tracked entity 206. As a result, the AI detection algorithm may generate a false negative outcome and fail to detect the tracked entity 206 within the image frame 240. Accordingly, in example embodiments, a user may make a selection 246 of a UI element 244 that enables the user to manually add a detection to the image frame 240. The user-provided detection may be added to the image frame 240 (and to the ultimate tracklet that is generated for this subset of image frames) based on visual observation of the presence (albeit potentially obscured) of the tracked entity 206 within the image frame 240.

Figure 2E:
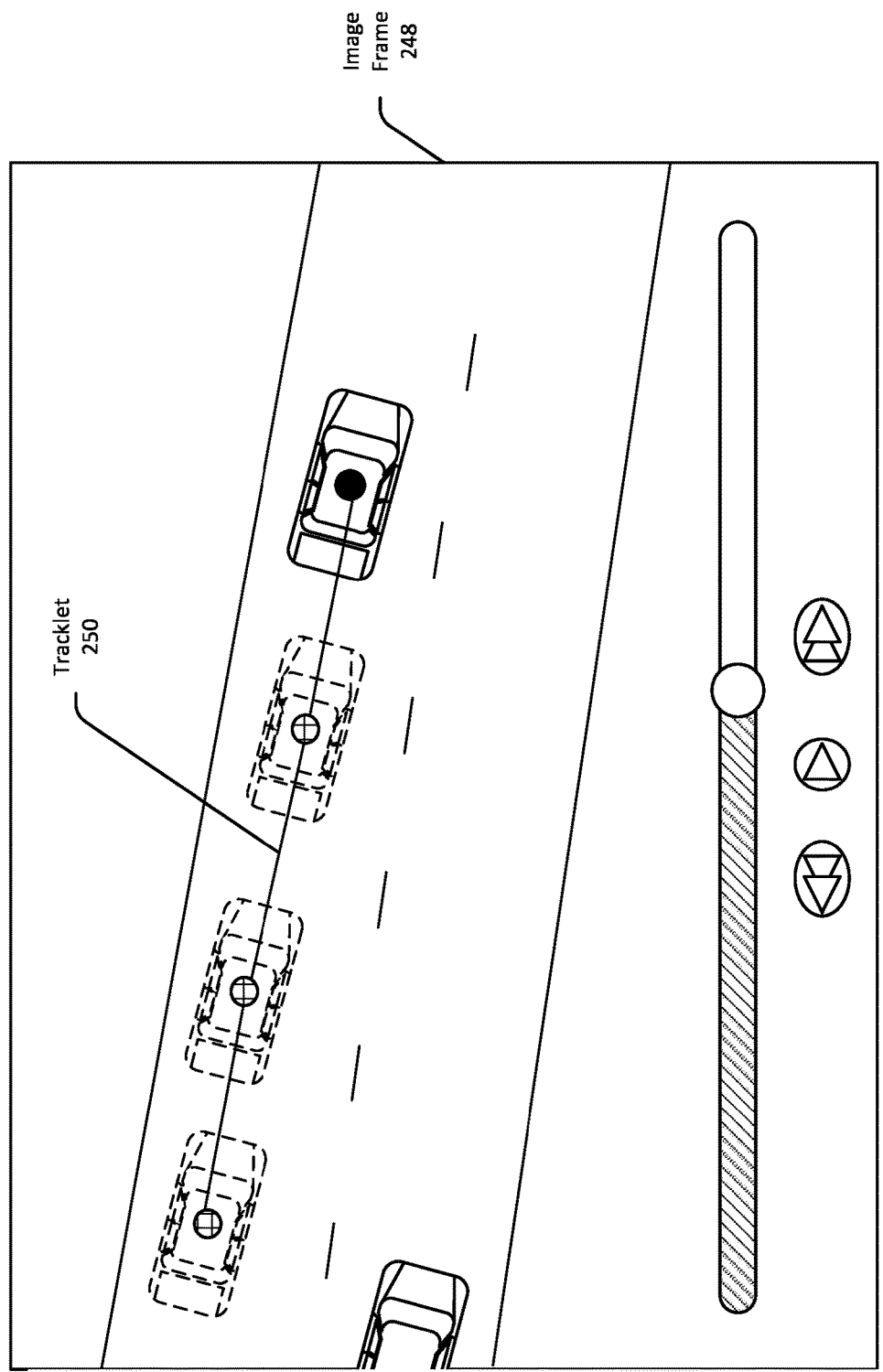
FIG. 2E illustrates a tracklet corresponding to an entity detected across a subset of image frames in accordance with an example embodiment of the invention.

In example embodiments, after a user has previewed some or all of the image frames in the subset of image frames, the user may exit out of the preview UI, in which case, the display returns to the first UI shown in FIG. 2E. An image frame 248 corresponding, for example, to a next image frame after the subset of image frames that were just previewed may then be displayed in the first UI. In addition, a tracklet 250 generated based on the AI detection validations performed up to the current image frame 248 may be graphically presented in the first UI. For instance, the tracklet 250 may be represented as a series of lines connecting validated AI detections, and optionally, user-provided detection(s) for the tracked entity 206 for image frames leading up to the current image frame 248. While not depicted in FIGS. 2A-2E, one or more additional tracklets may be appended to the tracklet 250 to generate a track for the tracked entity 206 that is indicative of a path of travel of the tracked entity 206 across a set of image frames.

Referring again to FIG. 1, after the track 128 is constructed, a geo-rectification engine 136 may geo-rectify the track 128 to generate a geo-rectified track 138. More specifically, the track 128 may deviate from the actual travel path of the tracked entity 110 in geometric space due to spatial and temporal limitations associated with the process for generating the video imagery that involves stitching together multiple image frames that are captured from different viewpoints and that cover different portions of a physical environment. In such example embodiments, the geo-rectification engine 136 may geo-rectify the track 128 to generate a geo-rectified track 138 that conforms to the actual travel path taken by the tracked entity 110 in relation to map data.

Figure 3:
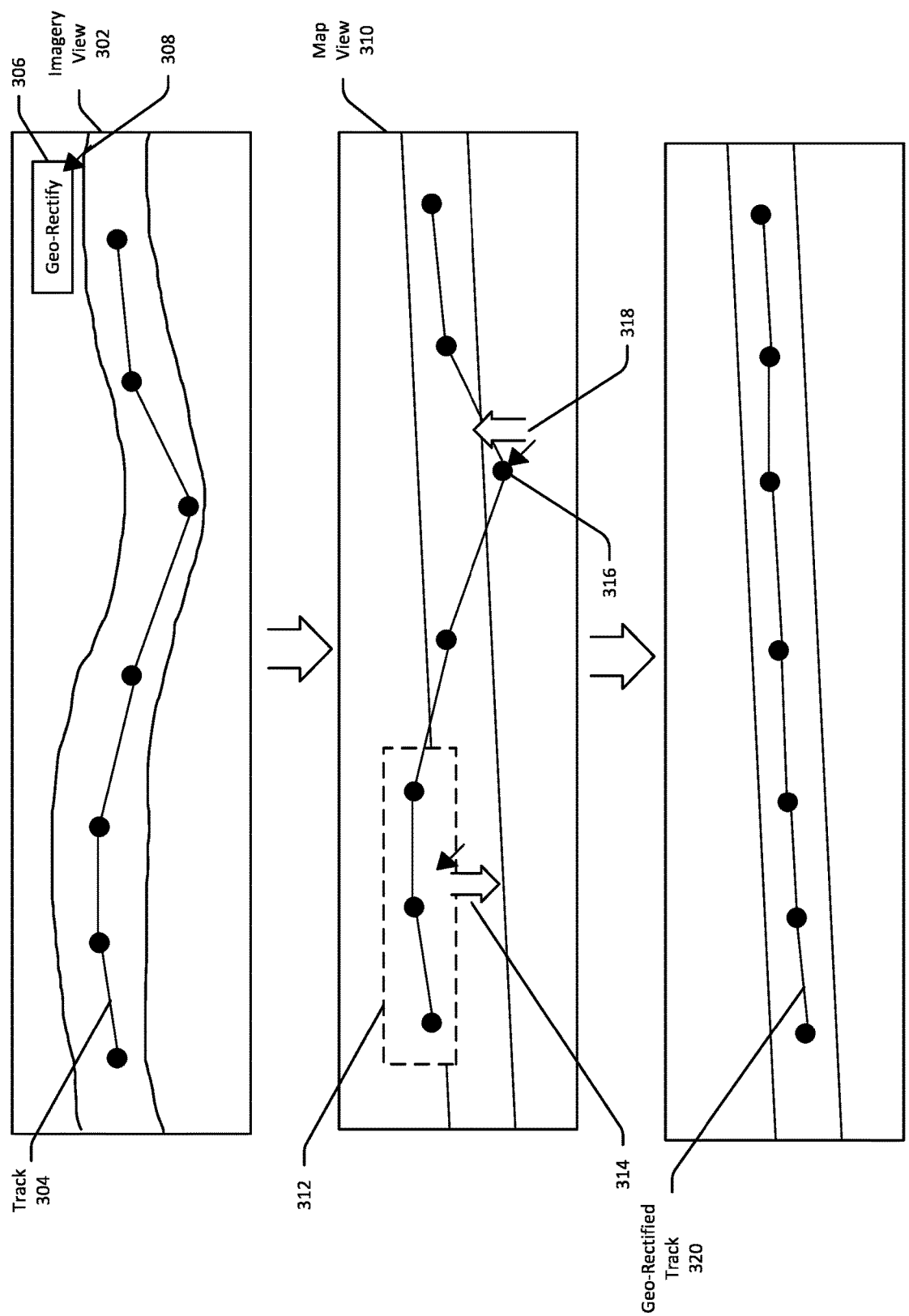
FIG. 3 illustrates geo-rectification of a track in accordance with an example embodiment of the invention.

FIG. 3 illustrates geo-rectification of a track in accordance with an example embodiment of the invention. FIG. 5 is a process flow diagram of an illustrative method 500 for geo-rectifying a track in accordance with an example embodiment of the invention. FIGS. 3 and 5 will be described in conjunction with one another hereinafter. In example embodiments, the geo-rectification engine 136 may execute one or more operations of the example method 500.

At block 502 of the method 500, the geo-rectification engine 136 may receive input to initiate a geo-rectification of a track such as the example track 304 depicted in FIG. 3. In particular, the track 304 may be initially presented with an imagery view 302 such as, for example, as an overlay over the corresponding video imagery. However, as previously noted, the track 304 may deviate from the actual travel path of a corresponding tracked entity in geometric space. Accordingly, a user may initiate a geo-rectification of the track 304 by selecting 308 a UI control 306.

At block 504 of the method 500, the geo-rectification engine 136 may switch the view from the imagery view 302 to a map view 310 responsive to the input received at block 502. The track 304 may now be presented as an overlay over a static map in the map view 310. As depicted in FIG. 3, the track 304 deviates from the map location of the road surface actually traversed by the tracked entity.

At block 506 of the method 500, the geo-rectification engine 136 may receive input indicative of adjustments to the track 304. For instance, a user may select a grouping 312 of detections of the track 304 (which may include validated AI detections and optionally one or more user-provided detections). The user may then perform an operation 314 on the selected grouping 312 such as a drag operation to re-align the selected grouping 312 of detections to the underlying road surface (or other traversed path) in the underlying static map. The user may also perform a similar operation 318 on an individual detection 316 to manually align it with the underlying map.

At block 508 of the method 500, the geo-rectification engine 136 may generate a geo-rectified track 320 based on the input received at block 506. As shown in FIG. 3, the geo-rectified track 320 may reflect an actual travel path of a tracked entity on a static map. In example embodiments, the geo-rectified track 320 may then be stored as an object that can be exported and accessed later.

Hardware Implementation

Figure 6:
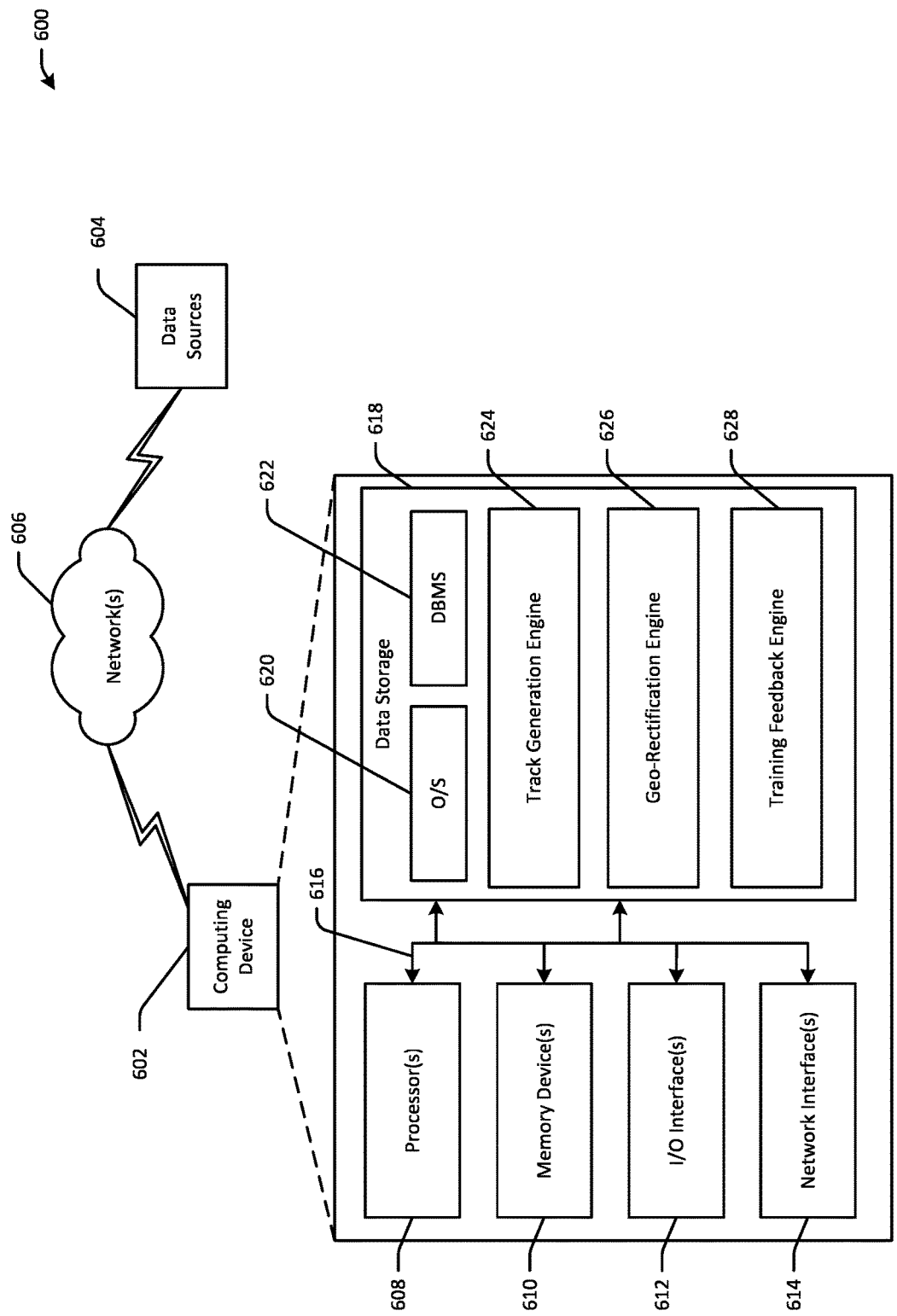
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to one or more data sources 604. The data source(s) 604 may include any suitable data source capable of being accessed and/or searched including proprietary data sources, public data sources, or the like. Data stored in such data source(s) 604 may include structured data, unstructured data, or the like. More specifically, data in the data source(s) 604 may include image data, AI detections, and so forth.

The special-purpose computing device(s) 602 may be hard-wired to perform techniques of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) 602 may be generally controlled and coordinated by operating system software 620, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other example embodiments, the computing device(s) 602 may be controlled by a proprietary operating system. The operating system software 620 may control and schedule computer processes for execution; perform memory management; provide file system, networking, and I/O services; and provide user interface functionality, such as a GUI.

While any particular component of the architecture 600 (e.g., the computing device(s) 602) may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. In example embodiments, the data storage 618 may store various engines/program modules such as a track generation engine 624, a geo-rectification engine 626, and a training feedback engine 628. Each of these engines may include logic for performing any of the processes and tasks described earlier in connection with correspondingly referenced engines. In other example embodiments, each of the aforementioned engines may include hard-wired circuitry for performing corresponding techniques of the invention and/or circuitry or digital electronic devices such as one or more ASICs or FPGAs that are persistently programmed to perform such techniques.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/program modules of the computing device 602. Such data may include, without limitation, image data, AI detection data, tracklet/track data, etc. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines of the computing device 602 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the 0/S 620 can be loaded from the data storage 618 into the memory 610 and can provide an interface between other application software executing on the computing device 602 and hardware resources of the computing device 602. More specifically, the 0/S 620 can include a set of computer-executable instructions for managing hardware resources of the computing device 602 and for providing common services to other application programs. In certain example embodiments, the 0/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like. Generally speaking, the datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 606 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive and that processing described as being supported by any particular engine can alternatively be distributed across multiple engines, components, modules, or the like, or performed by a different engine, component, module, or the like. In addition, various program module(s), engine(s), script(s), plug-in(s), Application Programming Interface(s) (API(s)), or any other suitable computer-executable code hosted locally on the computing device 602 and/or hosted on other computing device(s) accessible via one or more of the network(s) 606, can be provided to support functionality provided by the program modules depicted in FIG. 6 and/or additional or alternate functionality. Further, functionality can be modularized in any suitable manner such that processing described as being performed by a particular engine can be performed by a collection of any number of engines, components, program modules, or the like, or functionality described as being supported by any particular engine can be supported, at least in part, by another engine, component, or program module. In addition, engines that support functionality described herein can be executable across any number of computing devices 602 in accordance with any suitable computing model such as, for example, a client-server model, a peer-to-peer model, and so forth. In addition, any of the functionality described as being supported by any of the engines depicted in FIG. 6 can be implemented, at least partially, in hardware and/or firmware across any number of devices or servers.

It should further be appreciated that the computing device 602 can include alternate and/or additional hardware, software, or firmware components beyond those described or depicted without departing from the scope of the invention. More particularly, it should be appreciated that software, firmware, or hardware components depicted as forming part of the computing device 602 are merely illustrative and that some components may or may not be present or additional components can be provided in various embodiments. It should further be appreciated that each of the above-mentioned engines represents, in various embodiments, a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular engine can, in various embodiments, be provided at least in part by one or more other engines, components, or program modules. Further, one or more depicted engines may or may not be present in certain embodiments, while in other embodiments, additional engines not depicted can be present and can support at least a portion of the described functionality and/or additional functionality.

In general, the terms engine or program module, as used herein, may refer to logic embodied in hardware or firmware, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors.

Example embodiments are described herein as including logic or a number of components, program modules, engines, or mechanisms. Program modules may constitute either software modules (e.g., code embodied on a machine-readable medium) or hardware modules. A "hardware module" or "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may comprise non-volatile media and/or volatile media. A non-exhaustive list of more specific examples of the computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from with transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory, however, can operate in conjunction with transmission media. In particular, transmission media participates in transferring information between non-transitory media. For example, transmission media includes coaxial cables, copper wire and fiber optics, including the wires that comprise at least some of the bus(es) 616. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A system, comprising:
at least one processor; and
at least one memory storing computer-executable instructions, wherein the at least one processor is configured to access the at least one memory and execute the computer-executable instructions to:
present, via a first user interface, indicia representative of a plurality of detections of an entity within an environment across a set of image frames;
receive, via the first user interface, a selection of a particular detection of the entity for a particular image frame;
present, via the first user interface or a second user interface, a set of detections of the entity across a first subset of the set of image frames, the first subset of image frames including the particular image frame;
receive, via the first user interface or the second user interface, input validating or rejecting one or more detections in the set of detections of the entity;
construct a track representing at least a portion of a travel path of the entity, the constructing comprising appending first image frames, within the first subset of the image frames, that have been validated according to the input, while skipping second image frames, within the first subset of the image frames, that have been rejected according to the input.

2. The system of claim 1, wherein the at least one processor is configured to receive, via the first user interface or the second user interface, a second input indicating a user-provided detection of the entity; and wherein the construction of the track comprises appending third image frames in which the second input has been received to the first image frames.

3. The system of claim 1, wherein the second input indicates that the entity appearing in the third image frames has changed an appearance compared to the first image frames but has a same identity as the entity appearing in the first image frames.

4. The system of claim 1, wherein the input rejecting the one or more detections indicates that the one or more detections comprise one or more different entities of a same type as the entity.

5. The system of claim 1, wherein the at least one processor is configured to append fourth image frames to the track, the fourth image frames corresponding to a second subset of the set of image frames acquired subsequent to the first subset of the set of the image frames.

6. The system of claim 5, wherein the fourth image frames are separated from the track by a second subset of the image frames, wherein the second subset of the image frames are devoid of a detection of the entity.

7. The system of claim 5, wherein the fourth image frames are appended in response to an input identifying the entity on each of the fourth image frames.

8. The system of claim 1, wherein the at least one processor utilizes an algorithm that is configured to generate the plurality of detections, wherein the algorithm is trained based on the input.

9. The system of claim 1, wherein the at least one processor is further configured to execute the computer-executable instructions to perform a geo-rectification of the track to adjust the track to conform to underlying static map data.

10. The system of claim 1, wherein the constructing of a track comprises generating a video animation of activity associated with the entity.

11. A method, comprising:
presenting, via a first user interface, indicia representative of a plurality of detections of an entity within an environment across a set of image frames;
receiving, via the first user interface, a selection of a particular detection of the entity for a particular image frame;
presenting, via the first user interface or a second user interface, a set of detections of the entity across a first subset of the set of image frames, the first subset of image frames including the particular image frame;
receiving, via the first user interface or the second user interface, input validating or rejecting one or more detections in the set of detections of the entity;
constructing a track representing at least a portion of a travel path of the entity, the constructing comprising appending first image frames, within the first subset of the image frames, that have been validated according to the input, while skipping second image frames, within the first subset of the image frames, that have been rejected according to the input.

12. The method of claim 11, further comprising:
receiving, via the first user interface or the second user interface, a second input indicating a user-provided detection of the entity; and wherein the construction of the track comprises appending third image frames in which the second input has been received to the first image frames.

13. The method of claim 11, wherein the second input indicates that the entity appearing in the third image frames has changed an appearance compared to the first image frames but has a same identity as the entity appearing in the first image frames.

14. The method of claim 11, wherein the input rejecting the one or more detections indicates that the one or more detections comprise one or more different entities of a same type as the entity.

15. The method of claim 11, further comprising appending fourth image frames to the track, the fourth image frames corresponding to a second subset of the set of image frames acquired subsequent to the first subset of the set of the image frames.

16. The method of claim 15, wherein the fourth image frames are separated from the track by a second subset of the image frames, wherein the second subset of the image frames are devoid of a detection of the entity.

17. The method of claim 15, wherein the fourth image frames are appended in response to an input identifying the entity on each of the fourth image frames.

18. The method of claim 11, wherein the generating of the detections utilizes an algorithm, and the algorithm is trained based on the input.

19. The method of claim 11, further comprising performing a geo-rectification of the track to adjust the track to conform to underlying static map data.

20. The method of claim 11, wherein the constructing of a track comprises generating a video animation of activity associated with the entity.

* * * * *